INVENTORS
GEORGE M. GRASS, Jr &
MANFORD J. ROBINSON.

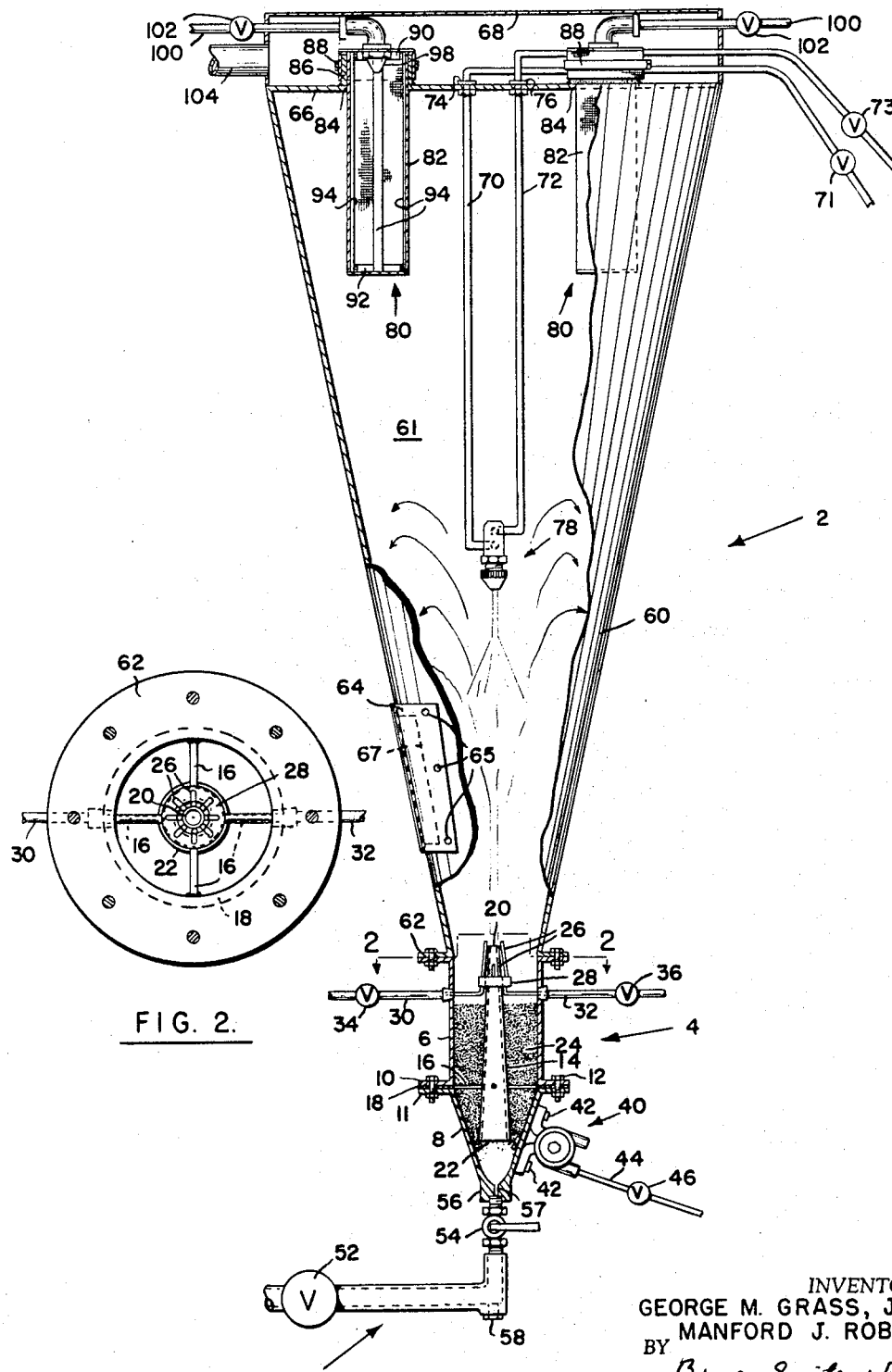

ATTORNEYS

3,411,480
Patented Nov. 19, 1968

3,411,480
DEVICE FOR COATING FINE SOLIDS
George M. Grass, Jr., Phoenixville, Pa., and Manford J. Robinson, Moorestown, N.J., assignors to Smith Kline & French Laboratories, Philadelphia, Pa., a corporation of Pennsylvania
Continuation-in-part of application Ser. No. 138,801, Sept. 18, 1961, now Patent No. 3,237,596, dated Mar. 1, 1966. This application Jan. 31, 1964, Ser. No. 341,512
10 Claims. (Cl. 118—24)

ABSTRACT OF THE DISCLOSURE

A device for coating fine solids has a coating chamber and a casing for containing a bed of solids in communication with the coating chamber with a powder nozzle within the casing. Gas supply means introduces a jet of gas into the casing to entrain solids from the bed into the powder nozzle. A spray nozzle in the coating chamber sprays a coating material onto the solids sprayed into the chamber by the powder nozzle. The gas supply means advantageously includes a nozzle and means to rotate the nozzle. Preferably, at least a portion of the interior of the coating device is lined with a permeable member having a permeability of from about 0.5 to about 6 and there is provided means to supply gas to said permeable member to flow gas into the interior of the device.

---

This is a continuation in part of application Ser. No. 138,801, filed Sept. 18, 1961, which is now Patent 3,237,596 dated Mar. 1, 1966.

This invention relates to an apparatus for coating discrete solids and more particularly relates to such an apparatus which is of particular utility for coatng fine particles of solids, for example, having a volume surface mean diameter ($d_{vs}$) of from about 5 to about 200 microns. By coating is meant the complete covering of the solids with a coating material, generally a dissimilar coating material.

It is known to coat discrete solids with liquefied coating materials by entraining the solids in an air stream and passing the air stream through a coating chamber into which the coating material is sprayed. Heretofore such operations have been carried out by continuously circulating the batch of material to be coated in the air stream. This involves the employment of large volumes of air at high velocity in the coating chamber which is satisfactory when the particles to be coated are relatively large. However, where the particles are relatively small such as, for example, under twenty microns in their maximum dimension, the particles tend to be carried out of the coating chamber in large volume through the system exhausting the air from the coating chamber.

Further, even with the employment of large volumes of air at high velocity the heretofore used systems failed to provide a good deagglomeration of relatively fine particles. This results from the fact that as size is reduced, the ratio of surface to mass of individual particles increases the tendency of the particles to come together and resist separation.

It is therefore the broad object of this invention to provide an apparatus for coating discrete solids of very small particle sizes which will prevent the removal of substantial portions of the batch being processed before the processing is completed and yet which will provide a continuous coating accompanied with excellent deagglomeration to prevent the particles from adhering to each other and forming clumps.

The method of coating discrete solids using the apparatus of this invention comprises forming a bed of fine solid particles, for example, having a volume surface mean diameter ($d_{vs}$) of from about 5 to about 200 microns. Particles are continuously withdrawn from the lower portion of the bed and passed through a nozzle with a gas such as air to deagglomerate the particles and eject them upwardly above the bed into a coating zone in a coating chamber. If further deagglomeration is required, as may be desirable with the finest powders, one or more gas jets, preferably of air, are directed at the solids as they emerge from the nozzle. These jets are also desirable when added gas is desired for solidification of the particles as they are being coated.

The bed of solid particles may, if desired, be a dense phase fluidized bed. If a fluidized bed is employed, it will advantageously be a quiescent fluidized bed (reference may be had to "Fluidization" by Max Leva, published in 1959 by McGraw-Hill Book Company for details of such beds). The movement of the particles in a fluidized bed reduces their agglomeration and assists in rounding and smoothing of the particles due to their rubbing together. While practical, the employment of a fluidized bed involves some difficulty in operation since fluidized beds are hard to control. It is satisfactory to simply employ a bed of the particles arranged so that they can freely flow to the point where they are withdrawn from the bed.

It is preferred to withdraw the particles from the bed by passing a jet of air from an air inlet nozzle through an opening in the bottom of the bed. It has been found that highly superior deagglomeration is accomplished if the jet is turbulent. Advantageously the Reynolds number taken at the discharge end of the air inlet nozzle employed to form the jet will be greater than $3 \times 10^3$. The turbulence within the jet can also be increased by rotating the nozzle preferably at over several thousand revolutions per minute. The thus created turbulence within the air inlet nozzle will cause turbulent flow of the jet for a considerable distance after it leaves the nozzle.

A liquid coating material is sprayed into the coating zone (preferably downwardly to assure good coating droplet to powder particle contact). The particles wetted with the coating material move downwardly and are directed into the upper portion of the bed. Solidifying of the coating material on the particles occurs after the particles leave the coating zone as they travel to the bed. Rounding and smoothing of the particles occurs due to the rubbing together of the coated particles as they fall and as they move in the bed. The coated particles returned to the bed gradually move downwardly as other particles are removed themselves to be recycled for another coating. The process is continued until the particles are satisfactorily coated with the desired amount of coating material. Thereafter, the particles are preferably further cycled in the apparatus as described above without the introduction of any coating material to further harden the coatings.

The apparatus of the invention can be used in applying a wide variety of liquefied coating materials to solids of any kind. Typical uses are for example, coating drugs, foodstuffs or other chemicals with liquefied waxes, resins, glycerides, fatty acids or polymers. The purpose of such coatings could be, for example, taste masking, sustained dissolution, enteric properties, improved stability, delayed interaction, wettability and improved flow properties.

The apparatus will be clarified on reading the following description in conjunction with the drawings in which:

FIGURE 1 is a front elevation partially broken away of a coating apparatus in accordance with this invention;

FIGURE 2 is a horizontal section taken on the plane indicated by the line 2—2 in FIGURE 1;

Figure 3:
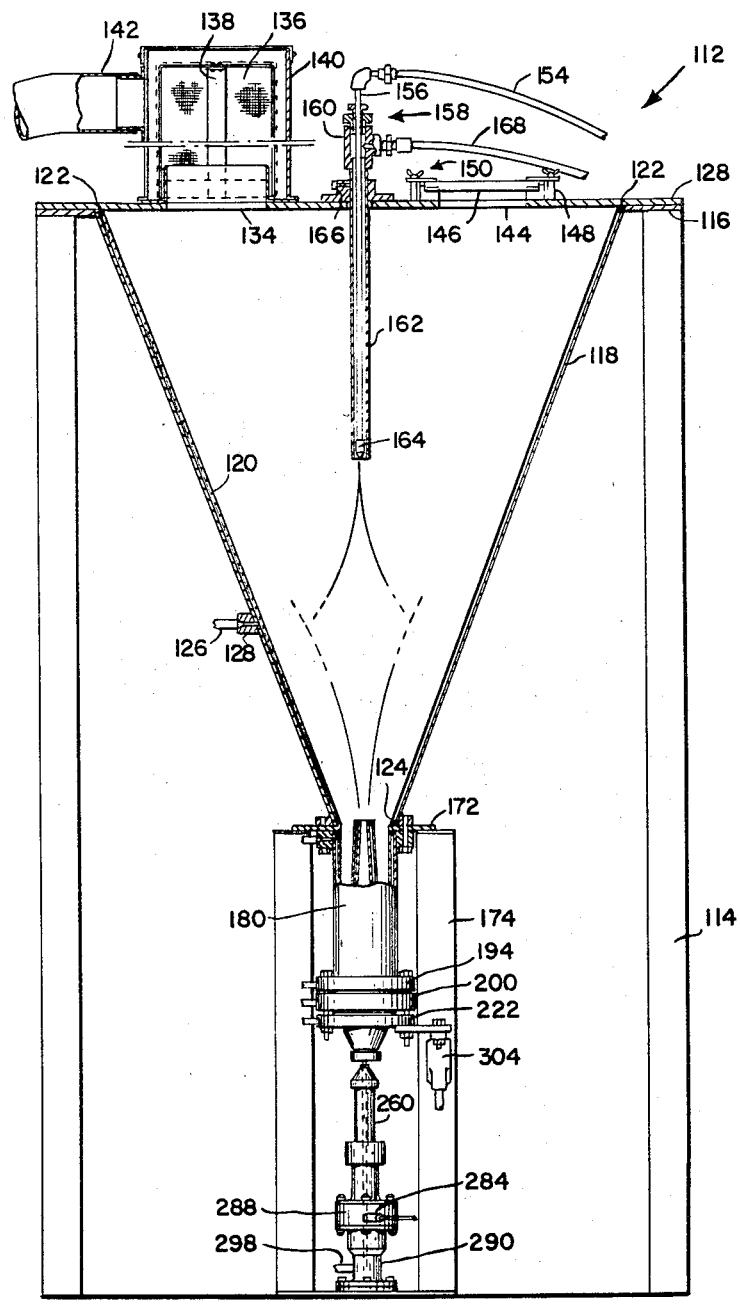
FIGURE 3 is a front elevation partially broken away of an alternative coating apparatus in accordance with this invention.

Referring first to FIGURE 1, a coating apparatus 2 has a fluidized bed casing 4 comprising a cylindrical upper section 6 and a frustum-shaped lower portion 8 which are respectively provided with flanges 10 and 11 secured together by bolts indicated at 12. Advantageously a plane tangent to portion 8 will lie at an angle to the vertical preferably lying at an angle of at least 20°. A powder nozzle tube 14 extends upwardly within casing 4 being supported by a spider 16 having a ring portion 18 which is held between flanges 10 and 11. Powder nozzle 14 has its relatively small inner and outer diameters at its upper end 20 and its relatively large inner and outer diameters at its base end 22. Base end 22 is located relatively close to the inner surface of lower section 8 to form a restricted opening. Casing 4 is adapted to contain a fluidized bed 24 of fine discrete solids, the level of bed 24 extending up into upper section 6 but below the upper end 20 of powder nozzle 14.

Referring both to FIGURES 1 and 2, a plurality of upwardly extending nozzles 26 whose axes are directed at the axis of nozzle 14 have their lower ends connected to a manifold ring 28 which is adapted to slide over the upper end of tube 14 and is secured thereto by a pressed fit. Manifold ring 28 is supplied with air under pressure by air supply lines 30 and 32 which are controlled respectively by valves 34 and 36.

As shown in FIGURE 1, an air actuated vibrator 40 is secured to the lower section 8 of casing 4 by bolts 42 and is supplied with air under pressure by air supply line 44 controlled by valve 46. A vibrator of the type shown in U.S. Patent No. 2,518,250 is satisfactory as are electrically actuated vibrators.

For the entrainment of the solids, air under pressure is supplied by an air supply line 50 controlled by valve 52. Line 50 is connected to a cock indicated at 54 which in turn is secured to a hollow boss 56 at the lower end of section 8. Boss 56 has a restricted nozzle opening 57, the upper end of which curves outwardly to meet the inner diameter of casing 4. A plug 58 is screwed into line 50 directly below casing 4 in order to permit the withdrawal of the processed material.

A frustum-shaped casing 60 forms a coating chamber 61 and has its lower end flanged to the upper section 6 of reservoir 4 as indicated at 62. A plane tangent to the periphery of the casing 60 will make an angle of at least 20° with the horizontal. While the frustum shape of casing 60 is advantageous, the casing may be of any shape so long as its diameter is at least equal to the diameter of section 6 and it will direct the particles into bed 24 as they fall after being coated. A cover 64 is secured to casing 60 by bolts indicated at 65 to provide access to the interior of coating chamber 61 through opening 67.

The upper end of casing 60 is closed by a plate 66 which in turn supports a cap member 68. An air supply line 70 controlled by valve 71 and a liquid coating material supply line 72 controlled by valve 73, respectively, pass through sealing members indicated at 74 and 76 and are connected to a downwardly directed atomizing nozzle indicated at 78.

Filters 80 in the upper portion of coating chamber 61 each are provided with a fine mesh filter bag 82 extending downwardly through opening 84 in plate 66 and having its upper open end doubled back over a pipe 86 secured to plate 66 about opening 84. A securing ring 88 overlies the upper end of bag 82 where it overlies pipe 86 to hold it securely to the pipe. Each bag 82 is maintained in an extended condition by means of a pair of spaced rings 90 and 92 to which are secured ribs 94. A clean out nozzle 98 projects into the interior of bag 82 and is supplied with air under pressure by air supply line 100 controlled by a valve 102. The air passing through filters 80 into the space between plate 66 and cap 68 is exhausted through an exhaust line indicated at 104.

OPERATION

In using the apparatus 2 to carry out the method of this invention, cover 64 is removed and a batch of solid particles is introduced into coating chamber 61 and permitted to fall down into casing 4, valve 52 and cock 54 having previously been placed in the closed position. Valve 52 is then opened to bring air up to cock 54 which is then opened to introduce a jet of air into casing 4 from nozzle opening 57. The air taking the path of least resistance moves upwardly into nozzle 14 entraining particles in the lower portion of the casing 4 and carrying them into nozzle 14. Sufficient air passes into the space between nozzle 14 and casing 4 to form fluidized bed 24 which in resisting the flow of air therethrough causes the great bulk of air introduced into casing 4 to pass through nozzle 14 at a relatively high velocity. After starting up, the air entrains particles from the bottom of fluidized bed 24 which, as shown in FIGURE 1, extends below the restricted opening formed between base 22 of nozzle 14 and the inner periphery of casing 4 in typical fashion. The velocity of the air and the entrained particles is increased as they progress toward the discharge end of nozzle 14 due to the decreasing cross-sectional area of the nozzle 14 and the entrained particles finally eject upwardly from the tube producing an upwardly extending spray of deagglomerated particles.

After the air has been turned on as described above, air and a spraying liquid are introduced into lines 70 and 72, respectively, to produce a downwardly projecting fine spray of coating material through spray nozzle 78 into a coating zone in the coating chamber 61. Thus, the upwardly projected particles pass through the sprayed coating material and are wetted. After being wetted, the particles fall against the walls of chamber 61 and move back down into fluidized bed 24 where they move downwardly by gravity until they are again entrained by the incoming air and carried up through the cycle described again, solidifying of the coatings takes place in the coating chamber after the particles pass outside of the coating zone into the remainder of the chamber which acts as a solidifying zone. Vibrator 40 is useful where it is desired to speed up the entrainment of particles by the air and is also useful to reduce the risk of air channeling through the fluidized bed.

Powder nozzle 14 by utilizing the jet of air from nozzle opening 57 to entrain only a small proportion of the total number of particles in casing 4 and by its nozzle effect produces an excellent deagglomeration effect which is markedly effective in separating agglomerated particles. This arrangement is further advantageous in that in order to achieve the necessary spraying and deagglomerating of the particles as they are projected into the coating chamber to be coated it achieves high velocity flow using a relatively small volume of air which makes it possible in a coating chamber of practical and convenient size to cause the great bulk of material being processed to fall downwardly before reaching the top of the coating chamber. This is of marked importance in preventing the exhausting of the fine particles from the apparatus and permits operation without the necessity for the employment of a recycling system in which an exhausted material is collected and recycled back into the apparatus.

During the operation of the coating apparatus 2, air is exhausted from the coating chamber through the filters 80, the small amount of powder which is carried up to the filters being trapped by the cloth filter bags 82 which permit the exhausting of the air upwardly and out through exhaust line 104. Any desired number of filters 80 can be employed, a plurality being desirable in order that the coating apparatus 2 may operate continuously without shutting down to clean filters. Filters 80 are cleaned periodically by the opening of valve 102 to introduce air through nozzle 98 within bag 82 at a pressure greater than the pressure in the upper portion of coating chamber 61 surrounding bag 82. This operation forces the particles on the exterior of filter bag 82 to drop off and fall downwardly into the lower portion of coating chamber 61 and thence into reservoir 4. The cleaning of filter bags 82 is done in a sequence such that an adequate number of filters are operative to exhaust air from coating chamber 61.

After the particles have been recirculated a sufficient number of times to provide the desired thickness of coating, the spraying of coating material through nozzle 78 is stopped. Preferably the cycling of the particles is continued to further harden the coatings. Then cock 54 and valve 52 are closed in that order. Plug 58 is then removed and a suitable container placed thereunder. The coated particles in casing 4 are then permitted to drop downwardly through the opening which was occupied by plug 58 by opening cock 54.

Particularly when extremely fine solids having a surface mean diameter of, for example, from about 5 to about 15 microns are being coated as described above, it is advantageous to open valves 34 and 36 to introduce a gas, preferably air, into manifold ring 28 to discharge gas through nozzles 26. The jets of gas discharging from nozzle 26 are helpful in the deagglomerating of the solids being ejected from pickup tube 14 and are also useful when it is desired to have present more gas for solidification of the coating material on the particles.

ALTERNATIVE EMBODIMENT

An alternative coating apparatus 112 is shown in FIGURES 3 through 6. Referring first to FIGURE 3, a frame 114 supports a ring 116 to which a frustum-shaped casing 118 is secured as by welding. An air permeable liner 120 lies within casing 118 and is spaced therefrom by an upper gasket 122 and a lower gasket 124. Air can be supplied to the space between casing 118 and liner 120 by an air supply line 126 connected to a source of air under pressure (not shown) which is secured to a fitting 128 on casing 118. The top of casing 118 is closed by a top plate 128 which seals tightly against gasket 122.

Plate 128 has an exhaust opening 134 over which a filter bag 136 is mounted on a frame 138. A filter housing 140 is spaced from and surrounds filter bag 136 and discharges into an air discharge line 142.

A loading opening 144 in plate 128 is closed off by a cover 146 held on mounting ring 148 by hold down members indicated at 150.

A liquid supply line 154 for a coating liquid is connected to a pipe 156 which passes through a bushing fitting indicated at 158 downwardly through a housing 160 and a pipe 162. The discharge end of pipe 156 is provided with an atomizing nozzle 164. Pipe 162 is secured to a fitting indicated at 166. An air line 168 discharges into housing 160, the air entering housing 160 passing freely between pipe 156 and the interior of pipe 162 to pass downwardly past nozzle 164 and entrain and carry downwardly the coating liquid being atomized by the nozzle.

Figure 4:
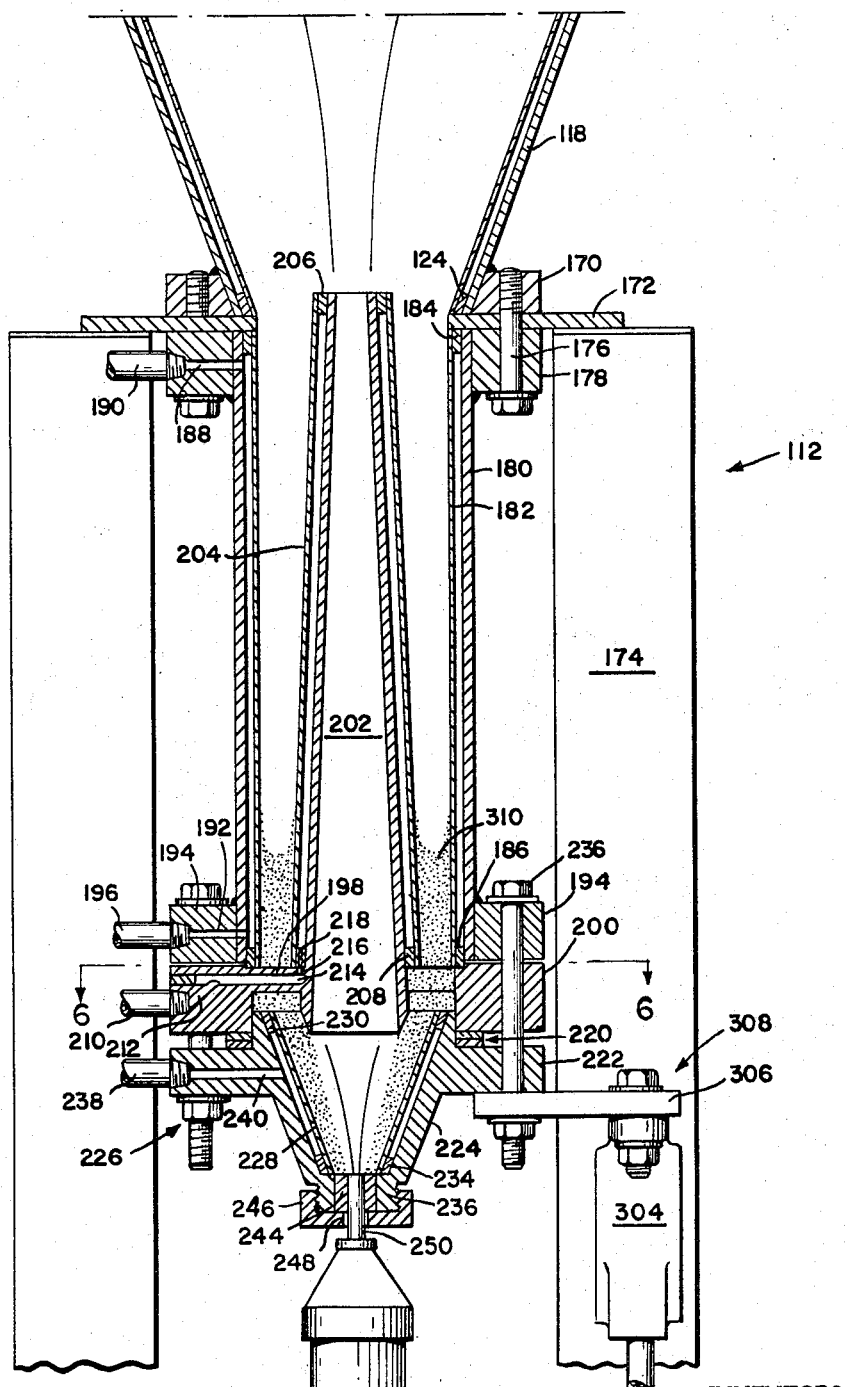
FIGURE 4 is a vertical section of the portion of the apparatus of FIGURE 3 above the nozzle giving an enlarged view.
Figure 6:
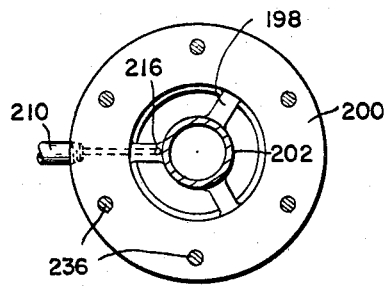
FIGURE 6 is a horizontal section taken on the plane indicated by the line 6—6 in FIGURE 4.

As best seen in FIGURE 4, the lower end of casing 118 is provided with a flange 170 which rests on supporting ring 172 which in turn is supported by frame 174. Bolts 176 bolt flange 178 secured to cylindrical casing 180 and flange 170 to the supporting ring 172.

A permeable liner 182 lies within casing 180 and is spaced therefrom by ring gaskets 184 and 186. Air is supplied to the space between casing 180 and liner 182 by pipe 190 connected to a source of air under pressure (not shown) and discharged into a drilled opening 188 in flange 178 and through a drilled opening 192 in flange 194 secured to the lower end of casing 180 which is connected to a pipe 196 which in turn is connected to a source of air under pressure (not shown).

Liner 182 is supported on a spider 198 provided with a flange 200. A conical powder nozzle 202 is integral with spider 198 and is surrounded by a permeable sheath 204 which is spaced therefrom by ring gaskets 206 and 208 and supported on spider 198. An air supply line 210 discharges into drilled passage 212 which discharges into drilled passage 214 which in turn discharges into drilled passage 216 leading to passage 218 in gasket 208 to supply the space between powder nozzle 202 and sheath 204 with air under pressure.

Flange 200 is supported on spacing rings indicated at 220 which in turn rests on flange 222 of casing 224 which is in the form of an inverted truncated cone. Flanges 194, 200 and 222 are bolted together by bolts 226.

Casing 224 has a liner 228 which is spaced away from casing 224 by ring gaskets 230 and 234, the liner 228 having its lower end supported by a reduced portion 236 of casing 224. An air supply line 238 is connected to a drilled opening 240 in flange 222 to supply air under pressure to the space between casing 224 and liner 228.

A bushing 244 is carried in reduced portion 236 of casing 224 and is supported by cap 246 which is threaded to this reduced portion and has an opening 248 for the reception of nozzle 250.

Figure 5:
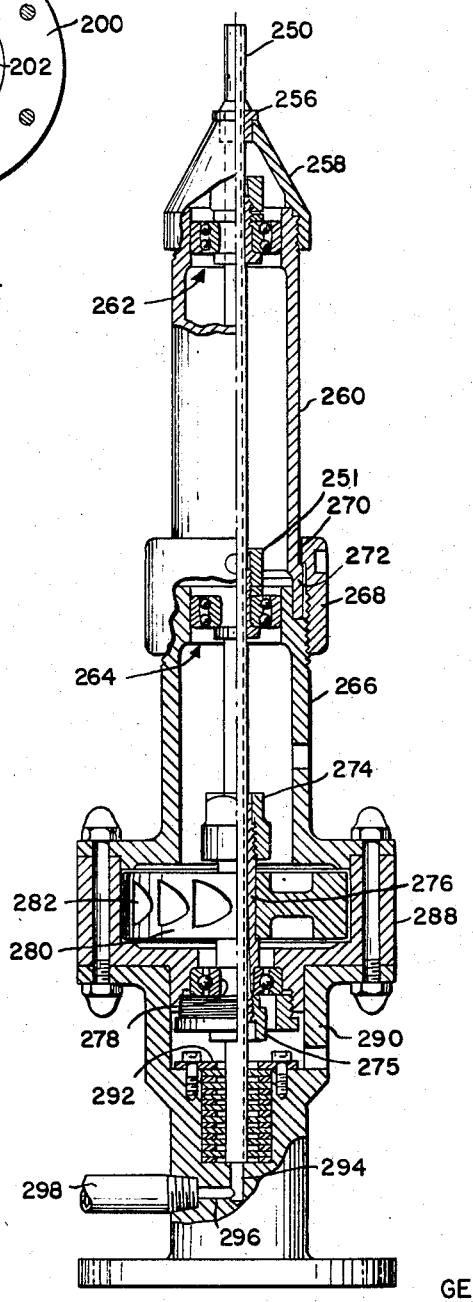
FIGURE 5 is a front elevation of the nozzle of the apparatus of FIGURE 3 partially broken away.

As best seen in FIGURE 5, the nozzle 250 passes downwardly through a bushing 256 secured in a cap 258 threadably mounted on casing 260. Nozzle 250 is engaged by a gland 251 which is ball bearing mounted for rotation as indicated at 262 within casing 260 and as indicated at 264 within casing 266. Casings 260 and 266 are secured together by means of a threaded collar 268 having an enlarged portion 270 engaging an enlarged portion 272 of casing 260.

A cap 274 is fixedly secured to nozzle 250. Turbine rotor gland shaft 276 is fixedly secured to nozzle 250 by nuts 274 and 275 and is ball bearing mounted for rotation as indicated at 278 and is fixedly secured to turbine rotor 280 which is provided with inset blades 282 against which air is directed by jets indicated at 284 (only one being shown in FIGURE 3). Turbine housing 288 is flanged to casing 266 and to casing 290. Casing 290 supports a packing 292 through which nozzle 250 passes downwardly to a point adjacent a drilled opening 294 in the base of casing 290. Passage 294 leads into a drilled passage 296 which is connected to a line 298 which supplies air under pressure from a source not shown.

Referring again to FIGURE 4, a vibrator 304 is bolted to a plate 306 as indicated at 308. Plate 306 is bolted to flange 222 by one of the bolts 236.

The above described permeable liners and sheets may be made, for example, of sintered metal such as stainless steel. Other porous bodies such as, for example, woven metals, porous ceramics such as porcelain and meshes may be employed as well as fabrics. While not critical, the permeability will be from about 0.5 to about 6 and preferably less than 4 where permeability is defined as: The amount (ft.$^3$) of air at 70° F. and 25% RH which will pass through an area of one square foot of a dry porous material in one minute when tested under a pressure differential of 2″ of water.

The lower end of powder nozzle 202 is spaced from the discharge end of nozzle 250 and has an inner diameter such that substantially all of the air and particles entrained therein pass into nozzle 202.

OPERATION

In operation, air is introduced through line 298, openings 296, 294 into nozzle 250 which produces a jet of air which is substantially all directed into the interior of powder nozzle 202. The air will have a Reynolds number greater than $3 \times 10^3$ in the discharge end of nozzle 250 and will be highly turbulent in the jet of air produced by the nozzle 250 with the turbulence gradually reducing in powder nozzle 202. For best results in deagglomeration, the jet will have a velocity approaching or exceeding the speed of sound. If it is desired to increase the turbulence, air will be introduced through nozzles 284, to turbine 280 which will rotate nozzle 250. Advantageously, the nozzles will be rotated in excess of 2000 r.p.m.

Cover 146 is removed and a batch of the particles to be coated is introduced into the interior of casing 118 and liner 120 which forms a coating chamber. The particles indicated at 310 will drop downwardly into the lower portion of casing 180, within flange 200 and within casing 224 to form, in effect, a bed of particles. Advantageously, vibrator 304 is energized to insure the ready downward flowing of the particles in the bed. A jet of air passing from nozzle 250 into powder nozzle 202 withdraws particles from this bed and carries them upwardly into casing 118.

The coating liquid is promptly introduced through line 154 into pipe 156 and is discharged through nozzle 164. Air is introduced through line 168 and downwardly through pipe 162 to discharge around nozzle 164 and entrain the atomized coating liquid particles. The distance between the lower end of pipe 162 and nozzle 164 and the upper end of powder nozzle 202 is selected to provide for maximum contact between the atomized coating liquid and the particles to be coated. The air velocity from pipe 162 is sufficient to entrain the wetted particles downwardly with the wetted particles being scrubbed out of the upwardly moving air stream from powder nozzle 202 to fall downwardly into the bed of particles in casing 180. As the particles fall, substantial solidification occurs with solidification continuing until the particles are again subjected to coating. A certain amount of agglomeration of the particles normally occurs in the bed. This agglomeration is broken up by the turbulence of the jet of air from nozzle 250 entraining the particles. The use of the turbulent jet is advantageous since it combines high deagglomeration with a minimum volume of air which makes it possible to employ a coating chamber of convenient size without substantial exhausting of the fine particles from the zone in which the coating is being carried out.

Where additional air is desired to promote drying of the coating or where there is a tendency for the particles to adhere to the walls of the apparatus, air will be introduced through one or more of pipes 126, 190, 196, 210 and 238 to cause air to pass into the apparatus respectively through liners 120, 182, sheet 204 and liner 228.

During the operation of the coating apparatus, air will be exhausted through filter bag 136 to pass out of housing 140 into line 142.

After the particles have been recirculated a sufficient number of times to provide the desired thickness of coating, the supply of coating liquid and air is effectively shut off from lines 154 and 168. The cycling of the particles is continued without the application of coating material to harden them to the desired degree at which time all the air being supplied to apparatus 112 is shut off. The thus treated particles will settle into casing 224. The particles are then emptied by removing the nozzle 250, nut 246 and bushing 244. The bed of particles will have a porosity in terms of uniformly sized spherical particles in the range of 0.3 to 0.6 depending on the particle material and the amount of air and vibration employed. In all events, the bed will be dense. The porosity in terms of uniformly sized spherical particles of the particle-air suspension in the powder nozzle 202 will be in the range of .9 to .999.

This invention is particularly useful in preparing a sustained release orally or parenterally administrable pharmaceutical product of solid particles of medicament having a volume surface mean diameter of from about 5 to about 100 microns covered completely with a time delay material.

What is claimed is:

1. A device for coating fine solids comprising a coating chamber, means to exhaust gas from the coating chamber, a casing for containing a bed of solids in communication with the coating chamber, a powder nozzle within the casing, gas supply means to introduce a continuous jet of gas into the casing to supply a flow of gas to entrain solids from the bed into the powder nozzle for spraying into the chamber, and a spray nozzle in the coating chamber adapted to spray a coating material onto the said solids, the gas supply means including a nozzle and means to rotate the nozzle substantially about the axis of the nozzle discharge.

2. A device for coating fine solids comprising a coating chamber, means to exhaust gas from the coating chamber, a casing for containing a bed of solids in communication with the coating chamber, a powder nozzle within the casing, gas supply means to introduce a continuous jet of gas into the casing to supply a flow of gas to entrain solids from the bed into the powder nozzle for spraying into the chamber, and a spray nozzle in the coating chamber adapted to spray a coating material onto the said solids, the gas supply means including a nozzle and means to rotate the nozzle substantially about the axis of the nozzle discharge at a speed in excess of 2000 r.p.m.

3. A device for coating fine solids comprising an upstanding coating chamber having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing, gas supply means to introduce a continuous jet of gas into the casing to entrain solids from the bed into the powder nozzle for spraying upwardly into the coating chamber, and a spray nozzle in the coating chamber adapted to spray a coating material onto the said solids, the gas supply means including a nozzle and means to rotate the nozzle substantially about the axis of the nozzle discharge.

4. A device for coating fine solids comprising an upstanding coating chamber having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing, gas supply means to introduce a continuous jet of gas into the casing to entrain solids from the bed into the powder nozzle for spraying upwardly into the coating chamber, and a spray nozzle in the coating chamber adapted to spray a coating material onto the said solids, the gas supply means including a nozzle and means to rotate the nozzle substantially about the axis of the nozzle discharge at a speed in excess of 2000 r.p.m.

5. A device for coating fine solids comprising an upstanding coating chamber having an upstanding wall circular in cross-section and having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing, gas supply means to introduce a continuous jet of gas into the casing to entrain solids from the bed into the powder nozzle for spraying upwardly into the coating chamber, a spray nozzle in the coating chamber adapted to spray a coating material onto the said solids, substantially all of the upstanding wall and casing being lined with a permeable member having a permeability of from about 0.5 to about 6, and means to supply gas to said permeable member to flow gas into the interior of the device through said permeable member.

6. A device from coating fine solids comprising a upstanding coating chamber having an upstanding wall circular in cross-section and having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing, gas supply means to introduce a continuous jet of gas into the casing to entrain solids from the bed into the powder nozzle for spraying upwardly into the coating chamber, a spray nozzle in the coating chamber adapted to spray a coating material onto the said solids, substantially all of the upstanding wall and casing being lined with a permeable member having a permeability of less than 4, and means to supply gas to said permeable member to flow gas into the interior of the device through said permeable member.

7. A device for coating fine solids comprising an upstanding coating chamber having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing, gas supply means to introduce a continuous jet of gas into the casing to supply a flow of gas between the casing and the powder nozzle to form a fluidized bed of solids within the casing and to entrain solids from the bed into the powder nozzle for spraying upwardly into the coating chamber, and a downwardly turned spray nozzle in the coating chamber adapted to spray a coating material countercurrent to solids sprayed upwardly by the powder nozzle, the gas supply means including a nozzle and means to rotate the nozzle substantially about the axis of the nozzle discharge.

8. A device for coating fine solids comprising an upstanding coating chamber having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing, gas supply means to introduce a continuous jet of gas into the casing to supply a flow of gas between the casing and the powder nozzle to form a fluidized bed of solids within the casing and to entrain solids from the bed into the powder nozzle for spraying upwardly into the coating chamber, and a downwardly turned spray nozzle in the coating chamber adapted to spray a coating material countercurrent to solids sprayed upwardly by the powder nozzle, the gas supply means including a nozzle and means to rotate the nozzle substantially about the axis of the nozzle discharge at a speed in excess of 2000 r.p.m.

9. A device for coating fine solids comprising an upstanding coating chamber having an upstanding wall circular in cross-section and having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing, gas supply means to introduce a continuous jet of gas into the casing to supply a flow of gas between the casing and the powder nozzle to form a fluidized bed of solids within the casing and to entrain solids from the bed into the powder nozzle for spraying upwardly into the coating chamber, a downwardly turned spray nozzle in the coating chamber adapted to spray a coating material countercurrent to solids sprayed upwardly by the powder nozzle, substantially all of the upstanding wall and casing being lined with a permeable member having a permeability of from about 0.5 to about 6, and means to supply gas to said permeable member to flow gas into the interior of the device through said permeable member.

10. A device for coating fine solids comprising an upstanding coating chamber having an upstanding wall circular in cross-section and having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing, gas supply means to introduce a continuous jet of gas into the casing to supply a flow of gas between the casing and the powder nozzle to form a fluidized bed of solids within the casing and to entrain solids from the bed into the powder nozzle for spraying upwardly into the coating chamber, a downwardly turned spray nozzle in the coating chamber adapted to spray a coating material countercurrent to solids sprayed upwardly by the nozzle, substantially all of the upstanding wall and casing being lined with a permeable member having a permeability of less than 4, and means to supply gas to said permeable member to flow gas into the interior of the device through said permeable member.

References Cited

UNITED STATES PATENTS

| | | | |
|---|---|---|---|
| 2,123,537 | 7/1938 | Marr | 117—31 |
| 2,270,341 | 1/1942 | Ransburg | 117—100 X |
| 2,561,392 | 7/1951 | Marshall. | |
| 2,561,393 | 7/1951 | Marshall | 117—100 |
| 2,561,394 | 7/1951 | Marshall | 117—100 |
| 2,582,710 | 1/1952 | Martin. | |
| 2,768,095 | 10/1956 | Tadema et al. | 117—100 |
| 2,799,241 | 7/1957 | Wurster | 118—62 X |
| 2,986,475 | 5/1961 | Nack | 117—100 X |
| 3,110,626 | 11/1963 | Larson et al. | 118—303 |

CHARLES A. WILLMUTH, *Primary Examiner.*

J. McINTOSH, *Assistant Examiner.*